US 7,246,353 B2

(12) United States Patent
Forin et al.

(10) Patent No.: US 7,246,353 B2
(45) Date of Patent: Jul. 17, 2007

(54) METHOD AND SYSTEM FOR MANAGING THE EXECUTION OF THREADS AND THE PROCESSING OF DATA

(75) Inventors: Alessandro Forin, Redmond, WA (US); Johannes V. Helander, Bellevue, WA (US); Paul T. Pham, Bethany, OK (US)

(73) Assignee: Microsoft Corporation, Redmond, WA (US)

( * ) Notice: Subject to any disclaimer, the term of this patent is extended or adjusted under 35 U.S.C. 154(b) by 690 days.

(21) Appl. No.: 10/167,559

(22) Filed: Jun. 12, 2002

(65) Prior Publication Data
US 2003/0233392 A1    Dec. 18, 2003

(51) Int. Cl.
G06F 9/46 (2006.01)
(52) U.S. Cl. ........................ 718/100; 718/102
(58) Field of Classification Search ............... 718/100, 718/102
See application file for complete search history.

(56) References Cited

U.S. PATENT DOCUMENTS

| 5,812,844 A | 9/1998 | Jones et al. |
| 6,003,061 A | 12/1999 | Jones et al. |
| 6,434,631 B1 * | 8/2002 | Bruno et al. ................... 710/6 |
| 2002/0046230 A1 * | 4/2002 | Dieterich et al. ........... 709/107 |

OTHER PUBLICATIONS

Helander et al.; *MMLite: A Highly Componentized System Architecture*; Eight ACM SIGOPS European Workshop, Sintra, Portugal, pp. 1-8; (Sep. 1998).
Dirk Grunwald, *The Design of DUDE*; cs.colorado.edu; pp. 1-2 (1995).
Dirk Grunwald, *Data Parallelism: Computation using Iterates*; cs.colorado.edu; pp. 1-4 (1995).
Jones et al.; *An Overview of the Rialto Real-Time Architecture*; Microsoft Research, Microsoft Corporation; Technical Report MSR-TR-96-13; pp. 1-9 (Jul. 1996).
Grunwald et al.; *The DUDE Runtime System: An Object-Oriented Macro-Dataflow Approach To Integrated Task and Object Parallelism*; University of Colorado; pp. 1-19; (1995).

* cited by examiner

Primary Examiner—Meng-Al T. An
Assistant Examiner—Kenneth Tang
(74) Attorney, Agent, or Firm—Lyon & Harr, LLP; Mark A. Watson (57) ABSTRACT

A method and system for managing the execution of threads uses a single scheduler for both threads and work items. Objects representing the threads and the work items are either maintained in separate queues or are stored together in a single queue. Each thread object or work item object may contain information that allows the scheduler to determine what order to execute the corresponding threads or to process the corresponding work items.

26 Claims, 7 Drawing Sheets

METHOD AND SYSTEM FOR MANAGING THE EXECUTION OF THREADS AND THE PROCESSING OF DATA

TECHNICAL FIELD

The present invention relates generally to scheduling techniques, and, more particularly, to the sorting of threads and work items in queues.

BACKGROUND OF THE INVENTION

Most computer programs are organized around one of two models: thread-oriented or data-oriented. In the thread-oriented model, the programmer organizes a program into a number of parallel activities, each a sequential program or "thread" of its own. One or more computer processors will execute each of these threads. Although a single processor may be capable of executing multiple tasks in quasi-parallel fashion by switching rapidly between the tasks, in general, only one thread executes on any one physical processor at a given time. Other threads will be either ready, but waiting for a processor to become available, or blocked waiting for some event, such as the completion of an I/O operation or the availability of some resource. When a thread is not executing on a processor, its state (e.g. the contents of various registers) is preserved in a block of memory. The software typically used to move threads between these three states, and to maximize overall system performance is known as a scheduler. In many systems, the scheduler is part of the core operating system.

In the data-oriented model, the programmer organizes a program around the input/output operations and the internal flow of data among sections of a program known as "compute blocks." The input data might originate from a human user, a storage device, another program, or another computer via a communication link. When input data becomes available, it is organized into a logical grouping, which will be referred to herein as a "work item." The work item is queued, waiting for the first compute block to process it. Once processed by the first compute block, the work item is either enqueued waiting for a second compute block to process it or is completed.

In most computer systems, threads and work items are managed by different schedulers. Furthermore, in those systems in which both threads and work items are used, threads waiting to be processed are stored in queues that are separate from those in which work items are stored.

SUMMARY OF THE INVENTION

The invention is generally directed to a method and system for managing the execution of threads and the processing of data, in which a single scheduler is used to schedule both threads and work items. Objects representing the threads and the work items are either maintained in separate queues or are stored together in a single queue. Each thread object or work item object may contain information that allows the scheduler to determine the order in which to execute the corresponding threads or to process the corresponding work items.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Prior to proceeding with a description of the various embodiments of the invention, a description of the computer and networking environment in which various embodiments of the invention may be practiced will be provided. Although it is not required, the present invention may be implemented by program modules that are executed by a computer. Generally, program modules (also referred to simply as "modules") include routines, objects, components, data structures and the like that perform particular tasks or implement particular abstract data types. The term "program" as used herein may connote a single program module or multiple program modules acting in concert.

The invention may be implemented on a variety of types of computers. Accordingly, the terms "computer," "client," and "server" as used herein include personal computers (PCs), hand-held devices, multi-processor systems, microprocessor-based programmable consumer electronics, network PCs, minicomputers, mainframe computers and the like. The invention may also be employed in distributed computing environments, where tasks are performed by remote processing devices that are linked through a communications network. In a distributed computing environment, modules may be located in both local and remote memory storage devices.

Figure 1:
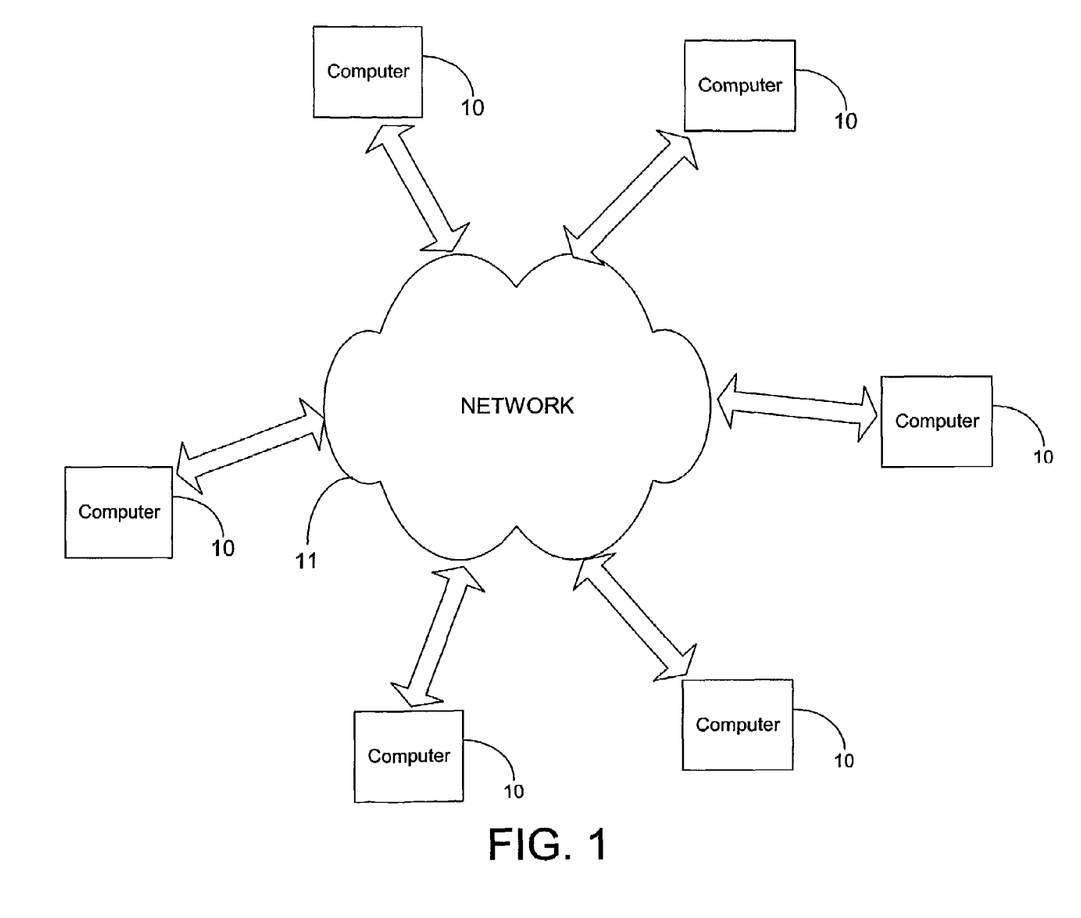
FIG. 1 shows an example of a computer network in which the invention may be practiced.

An example of a networked environment in which the invention may be used will now be described with reference to FIG. 1. The example network includes a plurality of computers 10 communicating with one another over a network 11, represented by a cloud. Network 11 may include many well-known components, such as routers, gateways, hubs, etc. and may allow the computers 10 to communicate via wired and/or wireless media.

Figure 2:
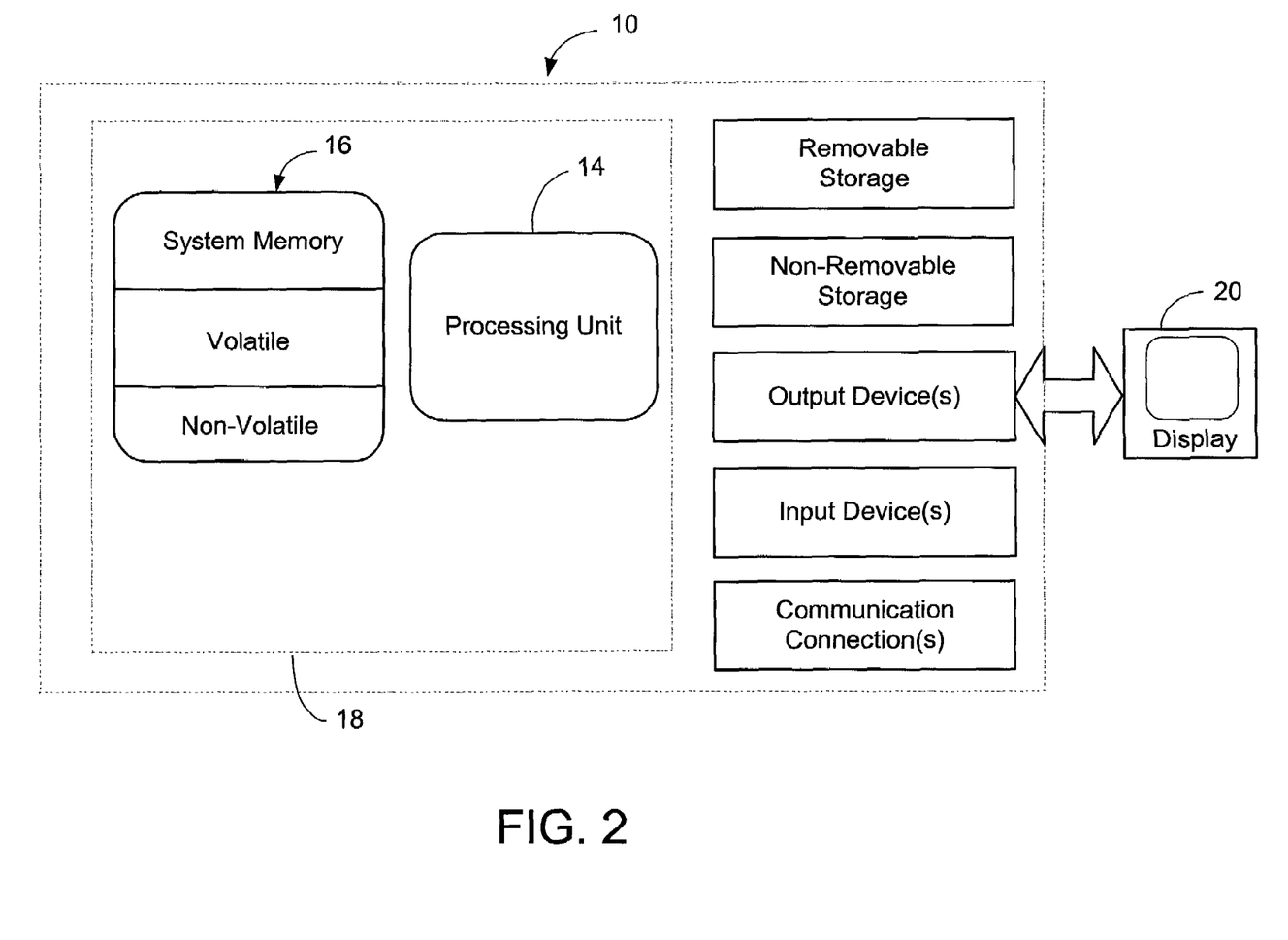
FIG. 2 shows an example of a computer on which at least some parts of the invention may be implemented.

Referring to FIG. 2, an example of a basic configuration for a computer on which the system described herein may be implemented is shown. In its most basic configuration, the computer 10 typically includes at least one processing unit 14 and memory 16. Depending on the exact configuration and type of the computer 10, the memory 16 may be volatile (such as RAM), non-volatile (such as ROM or flash memory) or some combination of the two. This most basic configuration is illustrated in FIG. 2 by dashed line 18. Additionally, the computer may also have additional features/functionality. For example, computer 10 may also include additional memory (removable and/or non-removable) including, but not limited to, magnetic or optical disks or tape. The computer 10 may use memory that is not physically located within the computer 10 itself but that is external to the computer 10 and accessible to the computer 10 by a communication connection (discussed below). The term "memory" includes volatile and non-volatile, removable and non-removable media, or any combination thereof, implemented in any method or technology for storage of information such as computer readable instructions, data structures, program modules, or other data. Memory includes, but is not limited to, RAM, ROM, EEPROM, flash memory or other memory technology, CD-ROM, digital versatile disk (DVD) or other optical storage, magnetic cassettes, magnetic tape, magnetic disk storage, other magnetic storage devices, or any other medium or combination of media which can be used to store the desired information and which can be accessed by the computer 10. Any such memory may be part of computer 10.

Computer 10 may also contain communications connections that allow the device to communicate with other devices. A communication connection is an example of a communication medium. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term computer readable media as used herein includes both memory and communication media.

Computer 10 may also have input devices such as a keyboard, mouse, pen, voice input device, touch input device, etc. Output devices such as a display 20, speakers, a printer, etc. may also be included. All these devices are well known in the art and need not be discussed at length here.

The invention is generally directed to a method and system for managing threads and work items by a single scheduler. The scheduler puts threads into a ready queue and orders them according to such criteria as time constraints and priority. The scheduler also puts work items into a ready queue, where they await computing blocks to process them. Work items are inserted and removed from the ready queue according to some algorithm, similar to how the scheduler inserts and removes threads. This algorithm could be a simple First In First Out (FIFO) logic, where work items are queued at the tail end and removed from the front end of the queue, or it could be more sophisticated. For example, if the work items are I/O operations, the scheduler may organize them to handle the movement of the mechanical parts of a disk drive in an efficient manner. The ordering criterion would therefore be based on the distance between the requested disk block number and the read/write heads.

Scheduling threads and scheduling work items involve many of the same issues: (a) They involve both operating on blocks of memory that are inserted and removed from a queue. There may be more than one queue, and items might move from one queue to another. (b) Work items move between the same three states that threads do: executing (by some computing block), ready to be processed but waiting for a computing block, or blocked waiting for the completion of an I/O operation or other event. (c) The selection process used by the scheduler makes use of some information that is associated with both threads and work items. For both threads and work items, this could, for example, be a priority level or a time deadline.

Various embodiments of the invention leverage the similarities between threads and work items to provide a single, unified scheduling framework that works with both thread-oriented and data-oriented parallel programs. Accordingly, a single scheduler is provided that is capable of scheduling both threads and work items. The scheduler keeps the queue(s) ordered according to some given ordering criteria. The ordering criteria is possibly external to the scheduler itself, and may be a simple comparison between scores (priorities, disk block numbers, etc.) or may involve a more sophisticated selection scheme to implement, for example, deadline-based real time scheduling. Each queued thread is represented by a thread object, while each queued work item is represented by a work item object. When a thread or work item transitions to the executing state, a dispatch function is called. For thread objects, this function loads the saved register state onto a processor. For work items, the function is the code for the next computing block—the one for which the work item was waiting. With a unified scheduler, thread-oriented and data-oriented programming can be either kept separate (using separate queues) or can be run together simply by using a single queue. In the latter case, programs written using the two models can interleave and cooperate. This allows a program to be written using both models at the same time.

In some embodiments of the invention, thread objects and work item objects may change into one another. For example, a thread can be terminated as a thread object and a new work item object is added, pointing to the function the thread was executing.

Figure 3:
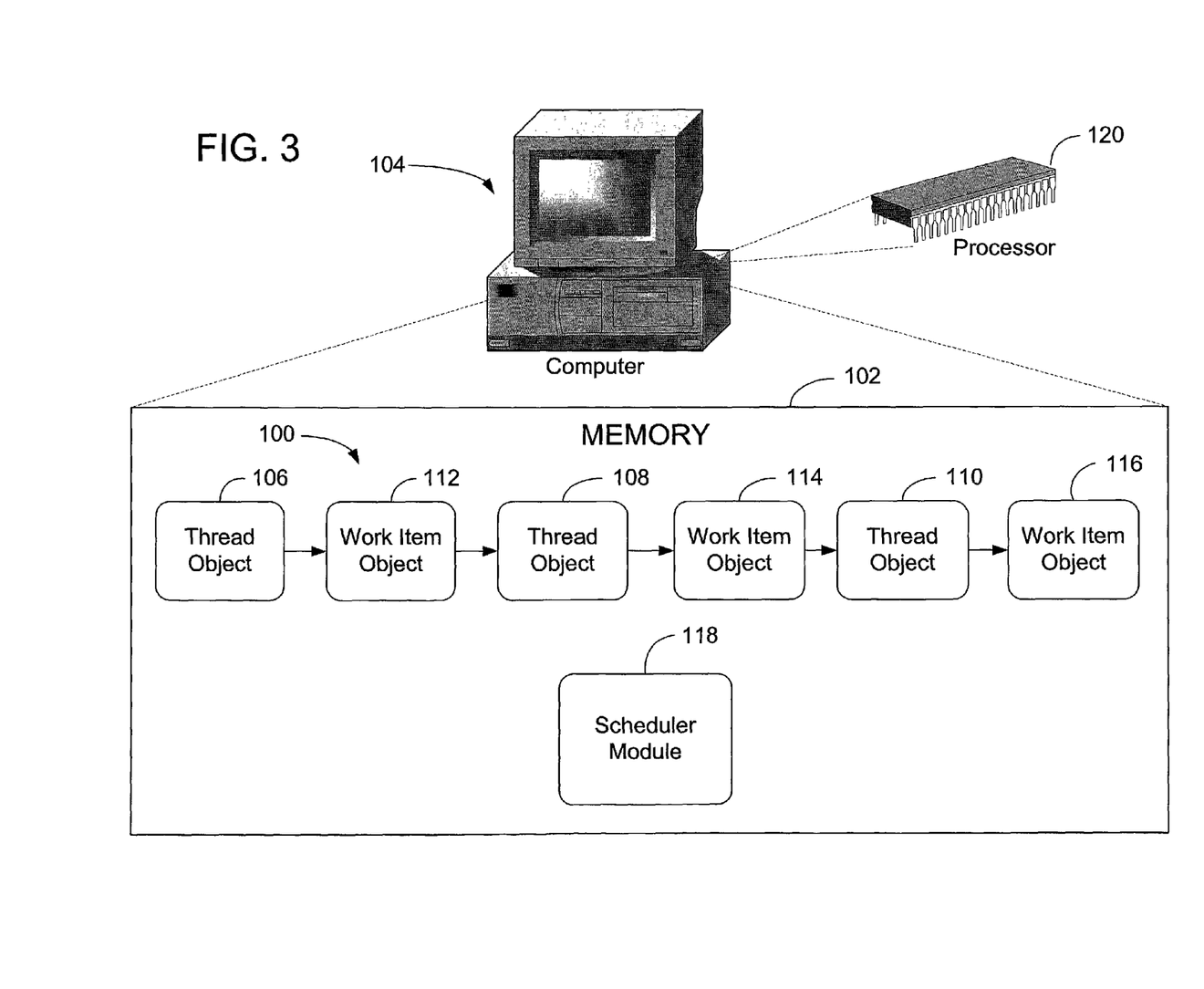
FIGS. 3-5a show various embodiments of the invention.

Referring now to FIG. 3, a computer 104 has a memory 102 and a processor 120. A queue 100 is stored in the memory 102, and includes thread objects 106, 108 and 110, and work item objects 112, 114 and 116. Each thread object represents a thread that is ready to be executed on the processor 120. Each work item object represents a logical grouping of data that will be processed according to some thread of execution of a program on the computer 104. In fact, a work item may be processed by one or more of the threads that are represented by the thread objects in the queue 100. One example of a work item is an Input/Output Request Packet (IRP) used in the MICROSOFT® WINDOWS XP® family of operating systems, which use IRPs to handle I/O operations at the kernel level. Another example of a work item is a database query. A third example is an Extensible Mark-up Language (XML) web service request delivered over Hypertext Transfer Protocol (HTTP).

As the processor 120 becomes available, it executes each thread and processes each work item that is represented in the queue 100 by the thread objects and work item objects. The order in which the threads represented by the thread objects 106, 108 and 110 are executed, as well as the order in which work items represented by the work item objects 112, 114 and 116 are processed by the processor 120, is determined by a scheduler module 118. The scheduler module 118 sorts the thread and work item objects of the queue 100 while they are in the queue 100, as they are inserted into the queue 100, or as they are being removed from the queue 100. The scheduler module 118 either sorts the thread objects separately from or together with the work item objects. A variety of scheduling policies may be enforced by the scheduler module 118. For example, the scheduler module 118 may sort the thread and work item objects according to first-in first-out (FIFO), based on time constraints associated with each object, based on priority values associated with each object, or based on external factors such as disk head movement. The scheduler 118 may also sort work item and thread objects according to inherited constraints or some other scheduling dependency (e.g. based whether a thread is blocked waiting for the completion of a work item, or vice versa). The scheduler module 118 may also query each object in the queue 100, whether a thread object or a work item object, to determine how it is to be sorted. For example, the scheduler module might query the first thread object 106 and discover that the first thread object 106 has a deadline associated with it, and needs to be ordered in the queue 100 ahead of all other objects that either don't have a deadline or have deadlines that are not as imminent as that of the first thread object 106.

Figure 4:
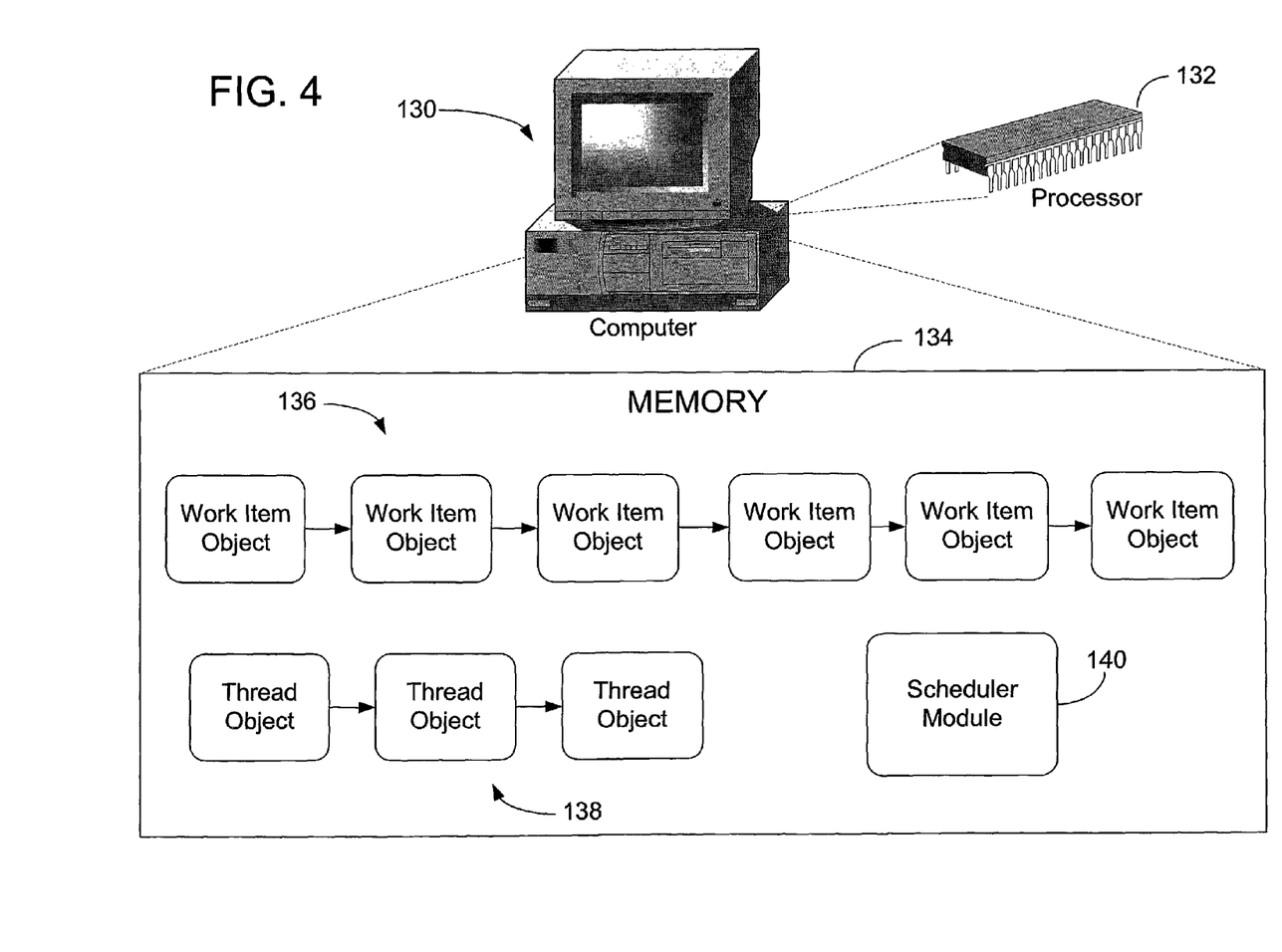

Referring to FIG. 4, an example of how thread objects and data objects may be put into their own respective queues according to various embodiments of the invention will now be described. A computer 130 has a processor 132, and a memory 134. The memory 134 has stored therein a first queue 136 for holding work item objects and a second queue 138 for holding thread objects. A scheduler module 140 sorts the work item objects of the first queue 136. Additionally, the scheduler module 140 sorts the thread objects to the second queue 138. As in the case of the scheduler module 118 of FIG. 3, the scheduler module 140 may sort the work item objects and the thread objects while they are in their respective queues, as they are being removed from their respective queues or as they are being placed in their respective queues.

Figure 5:
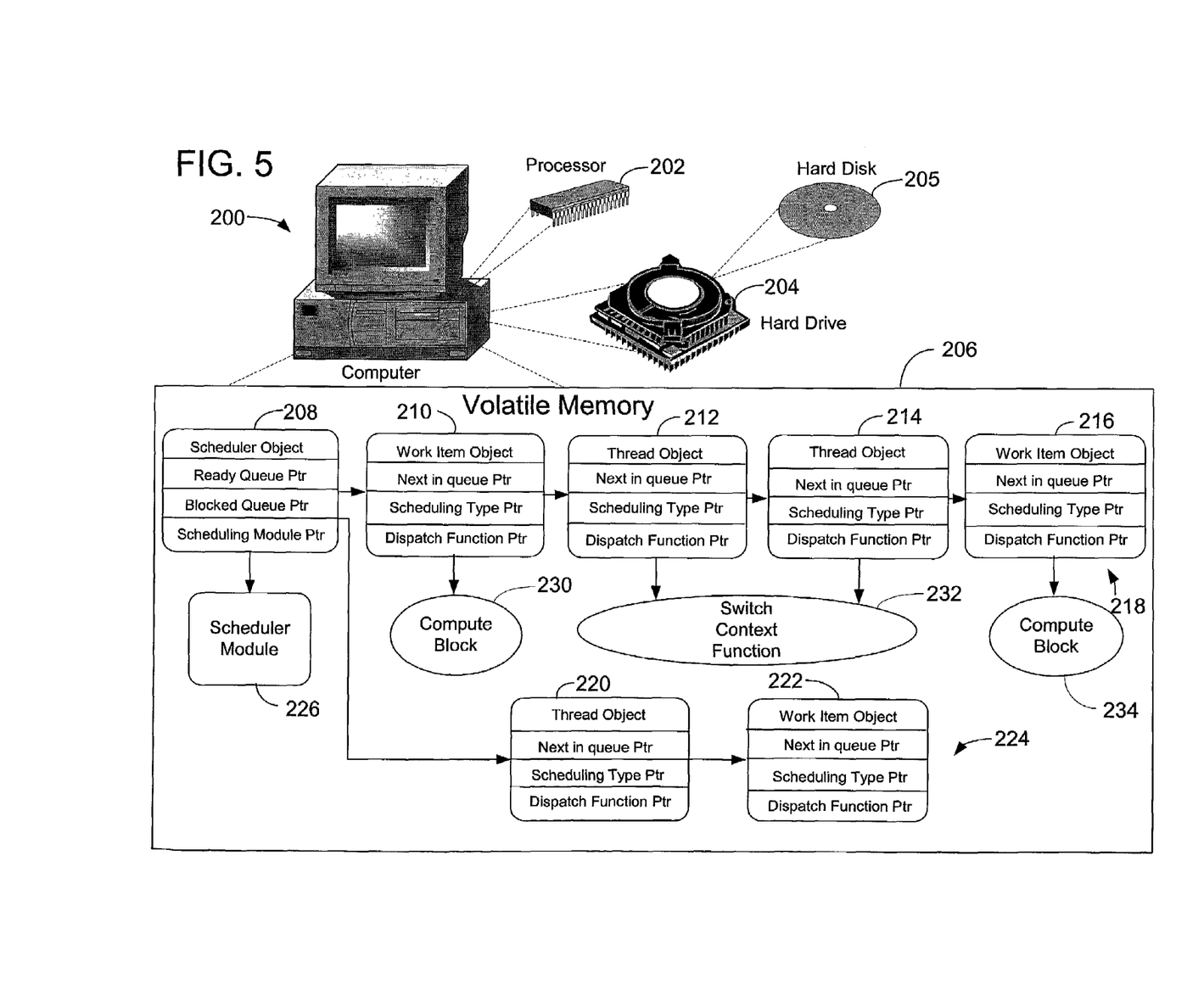

Referring to FIG. 5, a more specific embodiment of the invention will now be described. A computer 200 has a processor 202, a hard drive 204 having a hard disk 205, and a volatile memory 206. A scheduler object 208, a first work item object 210, a first thread object 212, a second thread object 214 and a second work item object 216 are stored in the volatile memory 204. The thread objects and work item objects 210-216 together comprise a ready queue 218. The ready queue 218 represents those threads or work items are ready to execute or be processed, but cannot presently do so because the processor 202 is not available. A third thread object 220 and a third work item object 222 are also stored in the volatile memory 206, and comprise a blocked queue 224. The blocked queue 224 represents those threads or work items that are not ready to execute or to be processed. There are many possible reasons for threads or data pockets to be blocked. For example, a thread or work item may be waiting for some future point in time. When that point in time arrives, the corresponding thread object or work item object is moved to the ready queue. Both the ready queue 218 and the blocked queue 224 are shown as simply linked lists, but doubly linked lists may be preferable. In other embodiments of the invention, the ready queue 218 or the blocked queue 224 may be implemented using a more complex data structure, such as a binary tree, a skip list, a hash table or a relational database.

Figure 6:
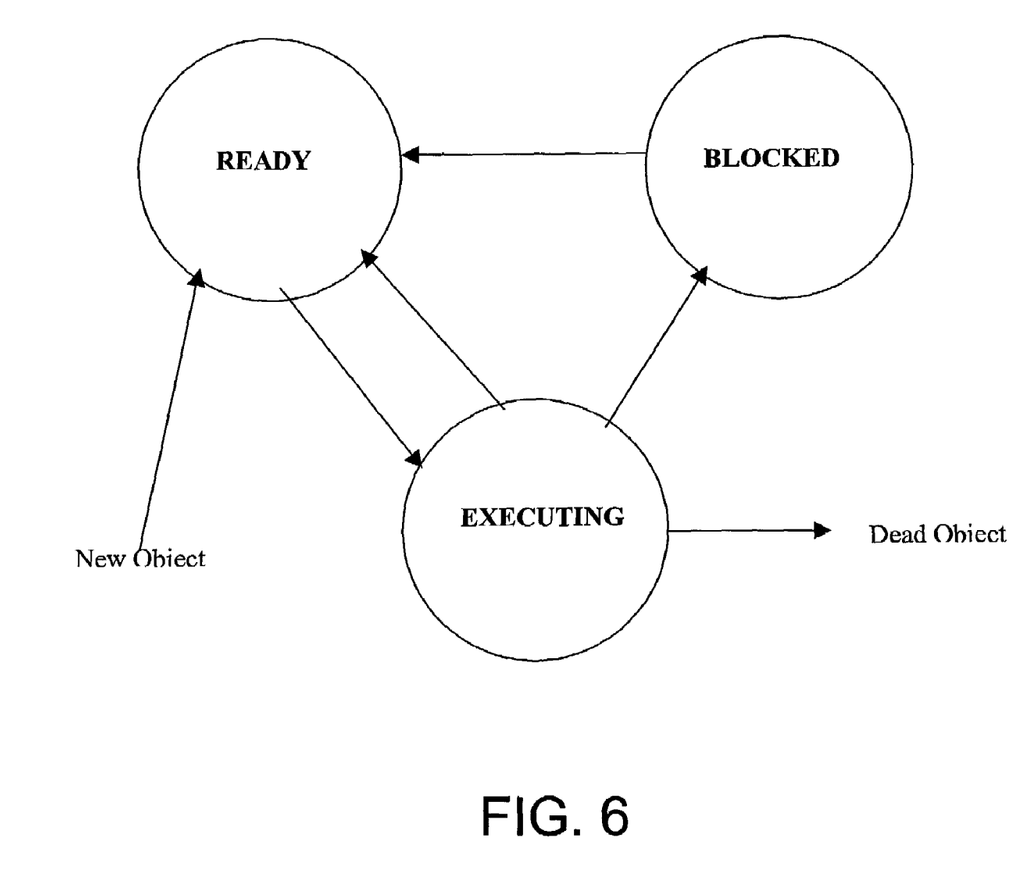
FIG. 6. shows a state diagram.

The volatile memory 206 also has a scheduler module 226 stored on it. The scheduler object 208 is implemented by the scheduler module 226. The scheduler module 226 and the scheduler object 208 interact with one another in various ways to carry out various aspects of the invention. It is to be recognized that the division of responsibility between the scheduler object 208 and the scheduler module 226 described here is meant as an example only. The scheduler object 208 has a scheduling module pointer that points to the scheduler module 226. The scheduler object 208 also has a ready queue pointer that points to the top of the ready queue 218 and a blocked queue pointer that points to the top of the blocked queue 224. Each of the objects in the ready queue 218 and each of the objects in the blocked queue 224 has a next-in-queue pointer, which points to the next object in the queue, and a scheduling data pointer, which points to data that tells the scheduler module 226 what kind of sorting needs to be performed on the object, and what kind of parameters are to be followed in the sorting. This data may include, for example, a time constraint, a priority rank, a disk block number, or any data that allows an object in the queue to be compared to another object in the queue and, therefore, allows the scheduler module 226 to determine if it is equal to, greater than, or less than the other object. Each of the objects in the ready queue 218 and in the blocked queue 224 also has a dispatch function pointer, which points to a function that is required to process a work item (in the case of a work item object) or execute a thread (in the case of a thread object). Invoking the dispatch function causes a thread or work item object to make a state transition. Examples of state transitions include: ready to executing, executing to ready, or executing to blocked. These transitions are illustrated in FIG. 6. The dispatch functions shown in FIG. 5 are as follows: the dispatch function for the first work item object 210 is a first compute block 230, the dispatch function for the first and second thread objects 212 and 214 is a switch context function 232, and the dispatch function for the second work item object 216 is a second compute block 234.

Figure 5A:
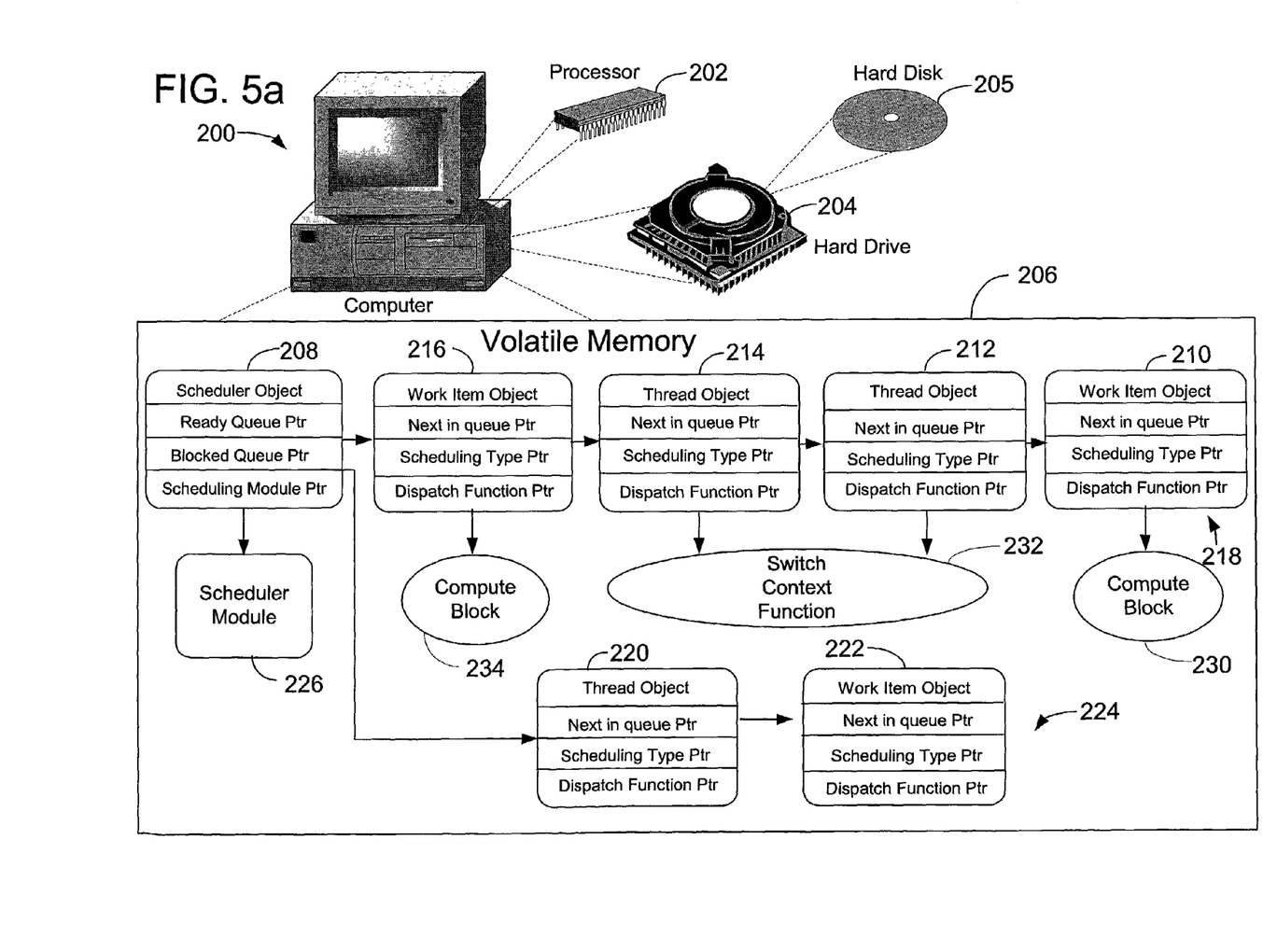

An example of how the scheduler module 226 sorts the ready queue 218 according to an embodiment of the invention will now be described. In this example, the objects of the ready queue 218 will be sorted while they are in the ready queue 218, however, it is to be understood that the sorting may also take place as the objects are being inserted into the ready queue 218 or while they are being extracted from the ready queue 218. The scheduling module 226 accesses the scheduling data of each of the thread and work item objects 210-216 of the ready queue 218 via their respective scheduling data pointers, and determines the following: (a) the work items represented by the work item objects 210 and 216 are located on the hard disk 205, must be obtained by disk I/O operations, are to be scheduled according to an elevator function so as to reduce the movement of the magnetic head of the hard drive 204, and that the best order in which to complete the I/O operations is to retrieve the work item represented by the work item object 216 first; (b) the threads represented by the thread objects 212 and 214 are to be scheduled according to time constraints, with the thread represented by the thread object 212 requiring execution within the next two milliseconds and the thread represented by the thread object 214 requiring execution within the next millisecond. The scheduling module 226 reorders the ready queue 218 by changing the ready queue pointer of the scheduler object 208 and changing the appropriate next-in-queue pointers of the objects in the ready queue 218. The result of this reordering is shown in FIG. 5a, in which the work item objects 210 and 216 have exchanged positions, and thread objects 212 and 214 have exchanged positions.

The operation of the scheduler module 226 (FIG. 5) according to various embodiments of the invention will now be described in the context of five example events:

1. A thread currently running on the processor 202 transitions from ready to blocked. In this particular case, the scheduler module 226 invokes the switch context function 232 using the dispatch function pointer (with a parameter indicating the transition is to the blocked state). The switch context function 232 function saves the register state of the thread in the volatile memory 206. A thread object representing the blocked thread is put into the blocked queue 224 (e.g. the thread object 220). The memory block in which the context is saved could be part of the thread object itself, or it could be pointed to by the thread object (e.g. it could be on the thread's execution stack). After the function returns, the scheduler module 226 selects the next object for execution.

2. The work item represented by the work item object 210 transitions from ready to executing. In this case, the work item object 210 is removed from the ready queue 218 and its dispatch function, the first compute block 230, is invoked. The first compute block 230 is serviced by a thread that executes on the processor 202 to process the work item represented by the work item object 210. According to various embodiments of the invention, the thread that services the first compute block 230 may be a thread that is currently executing on the processor 202, a separate per-processor thread, a newly created thread or a thread selected from a special pool. In another embodiment, the thread that is currently executing on the processor 220 may be temporarily hijacked to service the first compute block 230. If the thread that runs the first compute block 230 invokes a blocking operation, however, it is the work item that should block, not the thread, unless the thread was created specifically to process the work item.

3. The thread represented by the thread object 220 transitions from blocked to ready. This transition is of no interest to the dispatch function. Given that the thread cannot yet execute, its register state cannot be restored yet and will not change. The scheduler module 226 moves the thread object 220 from the blocked queue 224 to the ready queue 218. If the scheduler module 226 uses insertion-sort, the scheduler module 226 invokes the scheduling function of the scheduler object 208 to select the position in the ready queue 218 at which to place the thread object 220. If the scheduler module 226 does not use insertion sort, the thread object 220 will be inserted either at the front or at the end of the ready queue 218. This event can be triggered by a variety of causes. In this example it is assumed the thread represented by the thread object 220 had been blocked because its scheduling data indicated that the thread needed to wait two milliseconds before executing. It is also assumed that once this time elapsed, a timer went off and the interrupt routine for the timer invoked the scheduler module 226. Another example of why the thread represented by the thread object 220 might transition from blocked to a ready state is that it might have been waiting for a semaphore, and some other thread released the semaphore.

4. A thread that is executing on the processor 202 and that is processing a work item transitions from executing to blocked. In this case, the work item is also considered to have transitioned from executing to blocked. When this occurs, the scheduler module 226 puts an object representing the work item into the blocked queue 224, such as the work item object 222. One possible reason for a work item transitioning from an executing state to a blocked state is that the work item has undergone all necessary processing. In such a case, the object representing the work item will simply terminate once it reaches the ready queue 218 and is executed. In some embodiments of the invention a work item that enters a blocked state as a result of time slicing will not have its object placed in the blocked queue, but rather will have its object placed in the ready queue.

5. The thread represented by the thread object 212 transitions from ready to executing. The switch context function 232 is invoked (with a parameter indicating the transition is from the blocked state), which will restore the thread's register state and prepare the processor 202 to resume execution of the thread. The current thread pointer for the processor 202 is updated and the thread object 212 is removed from the ready queue 218.

It can thus be seen that a new a useful method and system for managing the execution of threads and the processing of data has been provided. In view of the many possible embodiments to which the principles of this invention may be applied, it should be recognized that the embodiments described herein with respect to the drawing figures is meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A method for managing the execution of threads and the processing of data, the method comprising:
on a computing system comprising one or more processors:
representing each of a plurality of threads by a respective thread object, wherein each thread of the plurality is a point of execution of a program on a processor of the one or more processors;
representing each of a plurality of work items by a respective work item object, wherein each work item comprises data that is to be used by a processor of the one or more processors to execute a block of computer executable code;
inserting each thread object into a first queue;
inserting each work item object into a second queue;
reordering both the thread objects of the first queue and the work item objects of the second queue using a single scheduler; and
wherein the reordering step comprises using the single scheduler for querying each of the plurality of thread objects and each of the plurality of work item objects to determine how each of the plurality of thread objects and each of the plurality of work item objects is supposed to be ordered in the respective first and second queues.

2. A computer-readable medium having stored thereon computer-executable instructions for performing the method of claim 1.

3. The method of claim 1, wherein the reordering step further comprises:
the single scheduler referencing a pointer in each of the plurality of thread objects or in each of the plurality of work item objects to determine how the thread objects and work item objects are to be sorted in the respective first and second queues.

4. The method of claim 1 wherein the reordering step further comprises:
the single scheduler determining the points in the first queue at which each of the plurality of thread objects is to be placed; and
the single scheduler determining the points in the second queue at which each of the plurality of work item objects is to be placed,
wherein the inserting steps are performed based on the results of the determining steps.

5. The method of claim 1, wherein the reordering step further comprises:
the single scheduler referencing a scheduling value for each of the thread objects in the first queue;

the single scheduler comparing the scheduling values of each of the thread objects to one another; based on the comparing step, the single scheduler sorting the thread objects.

6. The method of claim 1, wherein the reordering step further comprises:
the single scheduler referencing a scheduling value for each of the work item objects in the second queue;
the single scheduler comparing the scheduling values of each of the work item objects to one another; and
based on the comparing step, the scheduler sorting the work item objects.

7. A method for managing the execution of threads and the processing of data, the method comprising:
on a computing system comprising one or more processors:
representing each of a plurality of threads by a thread object, wherein each thread of the plurality of threads is a point of execution of a program on a processor of the one or more processors;
representing each of a plurality of work items with a work item object, wherein each work item of the plurality of work items comprises a logical grouping of data that is to be used by a processor of the one or more processors to execute a block of computer-executable code;
inserting each thread object and each work item object into a queue, the queue being the same for both the thread objects and the work item objects; and
ordering the thread objects and the work item objects in the queue by sorting the thread objects and work item objects as they are being inserted into the queue.

8. A computer-readable medium having stored thereon computer-executable instructions for performing the method of claim 7.

9. The method of claim 7, wherein the ordering step further comprises sorting the thread objects and work item objects as they are being extracted from the queue.

10. The method of claim 7, wherein the ordering step further comprises querying each of the thread objects and work item object to determine an ordering criteria for ordering each of the thread objects and work item objects.

11. The method of claim 7, wherein the ordering step further comprises determining the priority level of at least one of the thread or work item objects and assigning a position in the queue to the thread or work item object based on the determining step.

12. The method of claim 7, wherein the ordering step further comprises determining an execution time of at least one of the thread objects or work item object and assigning a position in the queue to the thread or work item object based on the determining step.

13. A computer-readable storage medium having stored thereon data comprising:
one or more queues;
a plurality of thread objects, each thread object representing a thread of execution of a computer program; and
a plurality of work item objects, each work item object representing a logical grouping of data that is to be operated on by one or more code sections of one, or more computer programs;
wherein the plurality of thread objects and the plurality work item objects are stored together in the same queue of the one or more queues;
wherein at least one of the thread objects has an execution time value that indicates when the thread object should be removed from the queue; and
wherein at least one of the work item objects has an execution time value that indicates when the work item object should be removed from the queue.

14. The computer readable medium of claim 13, wherein each of the thread objects has a scheduling value that indicates the order in which the thread object is to be removed from the queue.

15. The computer-readable medium of claim 13, wherein each of the work item objects has a scheduling value that indicates the order in which the work item object is to be removed from the queue.

16. The computer readable medium of claim 13, wherein at least one of the thread objects has a priority value that, when compared to the priority value of at least one other thread object indicates the order in which the thread object should be removed from the queue.

17. The computer readable medium of claim 13, wherein at least one of the work item objects has a disk block identifier that, when compared to the disk block number of at least one other work item object, indicates the order in which the work item object should be removed from the queue.

18. The computer readable medium of claim 13, wherein each of the work item objects include a reference to a computational block of executable code that receives the logical grouping of data represented by the work item object as an input.

19. The computer readable medium of claim 13, wherein each of the thread objects includes a reference to a function that enables a computer processor to switch context to the thread represented by the thread object.

20. A system for managing the execution of threads and the processing of data, the system comprising:
a means for executing a sequence of instructions of one or more computer programs, wherein when the instructions of a particular program are being executed, there is, at any given time, a thread of execution of the program representing the point in the sequence of instructions at which the executing means is executing an instruction, wherein at least one of the one or more programs is divided into computational blocks in which each computational block:
receives a logical grouping of data as input;
performs operations on the data contained in the logical grouping; and
passes the results of the operations in the form of another logical grouping of data to the next computational block or outputs the results;
a computer-readable storage medium having stored thereon a queue comprising:
a thread object representing a saved state of the thread of execution, wherein the thread object waits in the queue until a processor becomes available to resume the thread of execution from the saved state;
a work item object representing the logical grouping of data, wherein the work item object waits in the queue until a processor becomes available to execute the computational block that is to receive the logical grouping of data as input;
wherein the work item object and the thread object are among a plurality of objects in the queue; and
a means for ordering the plurality of objects according to an ordering criteria.

21. The system of claim 20, wherein the executing means comprises a processor of a computer.

22. The system of claim 20, further comprising a computer-readable disk for holding data for use by the executing means, wherein the ordering criteria is based, at least in part, on the amount of movement required on the part of the computer-readable disk.

23. The system of claim 20, wherein the ordering criteria is based, at least in part, on time constraints associated with at least some of the plurality of objects.

24. The system of claim 20, wherein the ordering criteria is based, at least in part, on priority scores associated with at least some of the plurality of objects.

25. The system of claim 20, further comprising a computer-readable medium having stored thereon at least one data-centric program that includes the computational blocks.

26. The system of claim 20, further comprising a computer-readable medium having stored thereon at least one thread-centric program that includes the sequence of instructions.

* * * * *